United States Patent [19]

Haynes et al.

[11] Patent Number: 5,509,738

[45] Date of Patent: Apr. 23, 1996

[54] COMPOSITE JOURNAL AND THRUST BEARING SYSTEM

[75] Inventors: Robert Haynes, Ontario, Canada; James F. McNamara, Kennett Square, Pa.

[73] Assignee: E. I. du Pont de Nemours and Company, Wilmington, Del.

[21] Appl. No.: 288,116

[22] Filed: Aug. 10, 1994

Related U.S. Application Data

[63] Continuation-in-part of Ser. No. 286,721, Aug. 5, 1994, abandoned.

[51] Int. Cl.[6] ................................................. F16C 17/10
[52] U.S. Cl. ........................... 384/275; 384/291; 384/297; 384/909
[58] Field of Search ......................... 384/275, 291, 384/300, 296, 909, 297

[56] References Cited

U.S. PATENT DOCUMENTS

| | | | |
|---|---|---|---|
| 2,901,297 | 8/1959 | Sternlicht | 384/291 |
| 4,575,145 | 3/1986 | Wolfram et al. | 384/300 |
| 4,582,368 | 4/1986 | Fujita et al. | 384/300 |
| 4,622,384 | 11/1986 | Manwiller . | |
| 4,710,036 | 12/1987 | Geczy | 384/275 |

*Primary Examiner*—Lenard A. Footland

[57] ABSTRACT

A composite journal and thrust bearing system having a bearing housing with a journal and a thrust face lined with a high performance polymer, such as a polyimide, that is useful in applications requiring loss of lubrication protection.

4 Claims, 2 Drawing Sheets

COMPOSITE JOURNAL AND THRUST BEARING SYSTEM

This application is a continuation-in-part of Ser. No. 08/286,721 on Aug. 5, 1994, abandoned.

BACKGROUND

The present invention relates to a composite journal and thrust bearing system that is especially useful and can be used in any large type bearing application requiring high pressure-velocity (P-V) and loss of lubrication protection.

Bearings are used in various applications, including, in particular, traction motor assemblies. A conventional traction motor bearing system includes a bearing housing having a journal and a thrust face. The inside of the journal and the thrust face are traditionally lined with babbitt as a bearing material. In addition, in order to insure lubricity between the bearing material and any axle running through the journal, a wick lubricator system is traditionally used to feed oil, or other appropriate lubricants, between the bearing material and the axle.

It has been found that in cold climates, or for other reasons, the wick in the wick lubricator system can freeze, thereby preventing the lubricant from being fed into the bearing system. Without an adequate supply of lubricant, the axle could conceivably wipe and seize in the bearing system and immediate failure could result.

In the present invention, it was found that by using certain high performance polymeric materials as the bearing material, there could be created a bearing system that could function for a longer time than conventional bearing systems when and if lubricant is not present. The composite bearing system described herein is especially useful in any bearing application requiring high P-V and loss of lubrication protection, such as traction motor bearings, crane bearings, large off-road equipment bearings, turbine bearings, pulp-paper dryer bearings, and steel industry roll bearings.

SUMMARY OF THE INVENTION

The present invention relates to a composite journal and thrust bearing system, and the process for making it, wherein the thrust face and the journal of a bearing housing are lined with a high performance polymeric material, such as polyimide, having good self-lubricating properties.

DETAILED DESCRIPTION OF THE INVENTION

Figure 1:
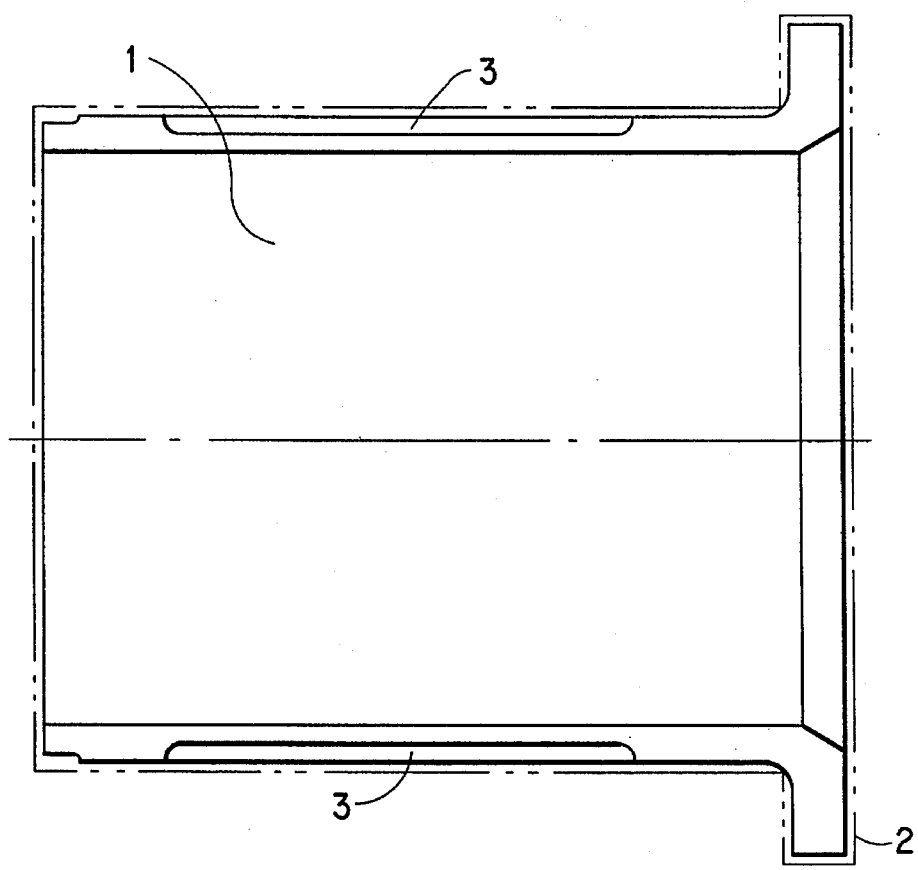
FIG. 1 is an inside longitudinal view of a split bearing housing having a journal (1), a thrust face (2), and two keyways (3).

The present invention relates to a composite journal and thrust bearing system comprising a bearing housing having a journal and a thrust face. More specifically, in the present invention, the journal and the thrust face of a longitudinally split bearing housing are lined with a high performance polymeric material having high P-V characteristics (preferably 100,000 psi-ft/minute or higher), said polymeric material serving as a bearing material. The polymeric material lining the inside of the journal can be the same as, or different than, the polymeric material lining the thrust face. Preferably, for ease of manufacture, it is the same material. Specific examples of such materials include, but are not limited to, polyimides (such as those described in U.S. Pat. Nos. 5,179,153; 5,284,904; 3,179,614; 4,622,384; and 4,759,987), polyimide-amides, polyetheretherketones, and polyetherketoneketones. Such materials may additionally contain lubricants, fillers, graphite, and other additives conventionally included in compositions made from these polymeric materials. Polyimides, due to their excellent self-lubricating properties, are the preferred polymeric materials.

In manufacturing the composite journal and thrust bearing system of the present invention, it is easiest to manufacture the bearing housing using standard techniques and then to split the housing in half longitudinally. The thrust face and inner diameter (i.e., journal) of the split bearing housing can be lined with the polymeric material, as described below.

The thrust face bearing can be prepared in a variety of ways, but preferably in a way that the resultant bearing surface is smooth. For example, if the thrust face is circular, a single circular of half-circular part of the polymeric material could be molded or machined and adhered onto the thrust face of the split bearing housing. However, at present, while such a process can be done, it can be expensive and uneconomical. In a more economical and commercially feasible method, the thrust face bearing can be made by machining or molding partial segments of, for example, polyimide that together form the shape of the thrust face. Suitable adhesive would be applied to the thrust face and the polyimide segments would be applied to the thrust face and tightly butted against each other. Weight would then be applied to the thrust face and held until the adhesive is fully cured.

The journal bearing can also be prepared in a variety of ways. The journal can be lined with a single machined part of polyimide but, as with the thrust face bearing, such a part is expensive to make and thereby it is not economical to do so at the present time.

In a preferred method, partial arcs (180°) of polyimide are prepared in segments. The radial length of the segments should extend above the split lines of the bearing housing, by, for example, ¼ inch. The actual length by which the segment exceeds the split-line of the bearing housing is not important, provided it is long enough to permit the clamping step described below. The thickness of the strips should be minimized for cost purposes and to optimize heat transfer. Removal of heat lowers the bearing interface temperature, which normally serves to extend the wear life of the bearing surface. The width of the strips can be readily discerned by those skilled in the art and it is dictated by the opening in the molding press used to make the strips. The polyimide strips need to line the journal in a way that they are tight against each other and result in a smooth surface. In order to achieve such a result, the polyimide strips could be molded or machined to be interlocking, but again such a process is expensive. The strips could also simply be mechanically locked to the inside of the bearing housing. A preferred method involves preparing a fixture that is in the shape of the inner diameter of the split bearing housing. The polyimide strips are aligned next to each other on the outside of the fixture and clamped together both axially and radially. Adhesive is applied, preferably to the inside of the housing, and the clamped strips-fixture assembly is placed in the housing under load until the adhesive is cured. The fixture is then removed. Excess adhesive and segment length are then removed from the split line.

The adhesive used in the process described herein needs to withstand the temperatures at which the bearing system will be operated and in addition, if a lubricant is used, it needs to be resistant to that lubricant. Commercially available adhesives, such as epoxies, are useful herein.

The two halves of the split bearing housing are assembled in a fixture that holds the two halves together. The thrust face and inside of the bearing housing (i.e., the journal) would be machined until smooth.

Although, due to the excellent lubricating properties of the polymeric materials used herein, it is not necessary to use a lubricant in the present invention, it is preferred to do so. In such a case, the bearing housing, in which the journal has been lined with the polyimide strips, can be machined to provide for a traditional wick lubrication system. In such a case, a slot would be machined longitudinally into one-half of the bearing housing to provide an inlet for the lubricant via, for example, a wick. Slots would be machined on the outer edges of the inner diameter of the journal to allow for the collection and recycling of the lubricant. In addition, the housing halves can be further machined at this point in a traditional manner to add grooves, chamfers, etc. as necessary.

EXAMPLE

The example given below describes a traction motor bearing assembly of the present invention, along with the process for making it.

Machining of a Split Bearing Housing

A split bearing housing, having a length of 12¼ inches, an inner diameter of 8 inches, a flanged thrust face at one end, and two keyways (½ inch wide×¼ inch deep×6 inches long) along the length of one housing at each split line is cast to shape from bronze using conventional molding techniques. The outer diameter at the flanged thrust face end is 12¼ inches, while at the non-flanged end it is 9½ inches. Each half is machined at the split line and fixed together with solder or dowel pins. The two halves are then machined together to form a bearing housing using current manufacturing methods and equipment. The bearing housing is then marked on each half as a matched set and then split. FIG. 1 shows a typical split bearing housing having a journal (1), a thrust face (2), and two keyways (3).

Preparation of the Split Bearing Housing for Bonding

The machined split bearing housing is then sand or grit blasted on its inside diameter (i.e., journal) and its flanged thrust face and then cleaned with a solvent, such as methyl ethyl ketone (MEK) to remove any contaminates. The journal and flanged thrust face surfaces are now ready for bonding.

Preparation of Partial Arc Segments and Thrust Face Segments

The partial arc segments for the lining of the journal and the thrust face segments for the lining of the flanged thrust face are prepared from graphite-filled Vespel® SP 21, which is compression molded and sintered into the appropriate shapes. The radial length of the partial arc segments exceeds the split lines of the bearing housing by ¼ inch. Eighteen partial arc segments (nine per half of the bearing housing) (about 1¼ inches each) are made for the journal lining and twelve thrust face segments (six per half of the bearing housing) (30° each) are made for the thrust face lining. The thickness of the partial arc segments is about 3/16 inches and the thickness of the thrust face segments is about 3/16 inches.

Fixturing of the Partial Arc Segments for Bonding

The partial arc segments for the journal lining are assembled in a clamping fixture which locates them both axially and radially. They are then clamped axially to ensure that each segment is butted side by side without any gaps. The extended sections of the segments are then clamped radially in order to hold all the segments to the upper part of the fixture. The outer surface of the segments are then cleaned with MEK to prepare for bonding.

Fixturing of the Thrust Face Segments for Bonding

The thrust pads are also fitted into a fixture which holds 6 pads for one-half of the bearing. They are clamped in such a way as to keep the pads flat and in contact with each other without any gaps. The pads are then cleaned with MEK to prepare for bonding.

Bonding of the Thrust Face Segments

Figure 2:
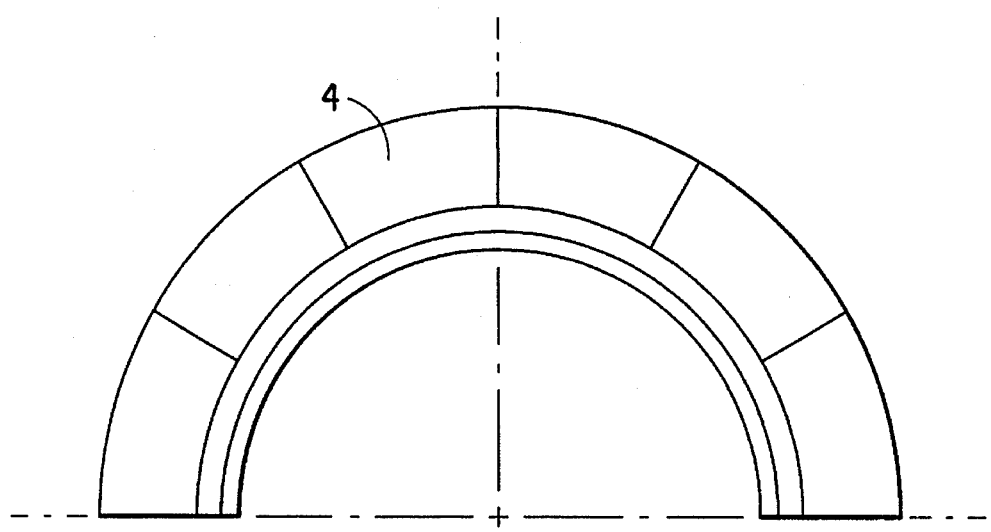
FIG. 2 is the front thrust face view, with thrust face segments (4), of a split bearing housing.

The flanged thrust face of the split bearing housing which has been prepared for bonding is coated with an epoxy adhesive, like DP460 (sold by 3M), using a notched trowel to evenly distribute the adhesive. Excess adhesive, which will be pressed out under load, is applied to ensure good coverage. The thrust face segments are clamped onto a fixture having the same shape as the thrust face of the split bearing housing. The fixture holding the thrust face segments is then located on the split bearing housing with the adhesive and clamped in position. The clamping load will ensure that the adhesive is evenly compressed, making good contact with the thrust face segments. The adhesive is allowed to fully cure before removing the bearing from the clamping fixture. All excess adhesive is then removed from the edges of the bearing. FIG. 2 shows the thrust face of the split bearing housing having the thrust face segments (4) bonded onto it.

Bonding of the Partial Arc Segments

Figure 3:
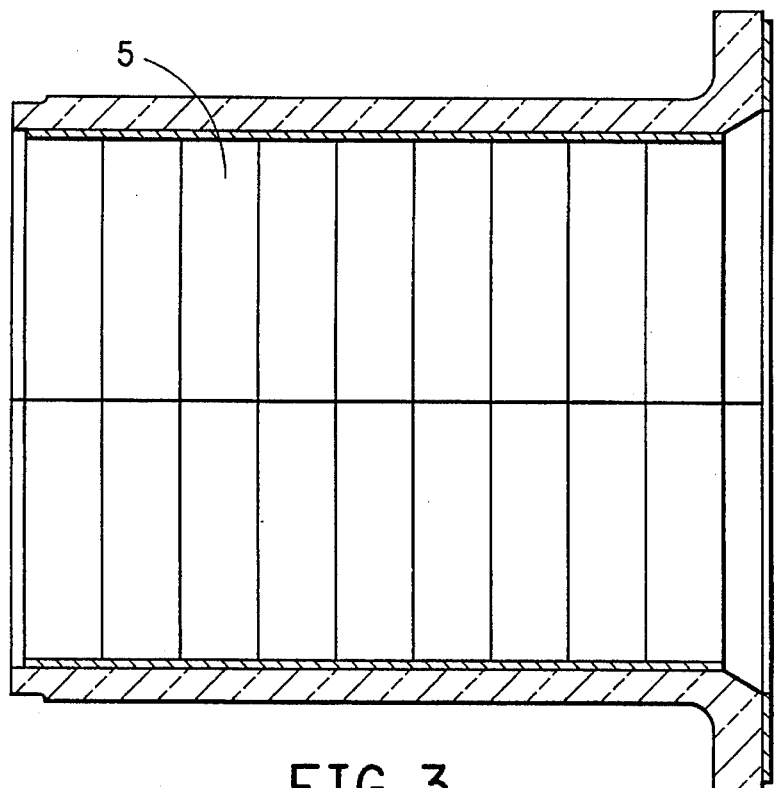
FIG. 3 is an inside view of the split bearing housing lined with partial arc segments (5).

The inside diameter of the split bearing housing, which has been prepared for bonding, is coated with the epoxy adhesive using a notched trowel and then placed in a clamping fixture. The partial arc segments are clamped, longitudinally and radially, onto a fixture made in the shape of the inner diameter of the bearing housing. The fixture holding the partial arc segments is then placed in the split bearing housing. A clamping load is applied in such a way as to make the adhesive flow evenly between the partial arc segments and the split bearing housing. Excess adhesive is squeezed out of the interface at the edges of the bearing housing. The adhesive is allowed to cure while the bearing is still clamped in the fixture to ensure that the segments do not move but remain tightly butted together. After curing, the excess adhesive is removed and the extended sections of the polymer partial arc segment are machined flush with the housing. FIG. 3 shows the split bearing housing, the inside of which is lined with the partial arc segments (5).

Final Assembly and Machining

Figure 4:
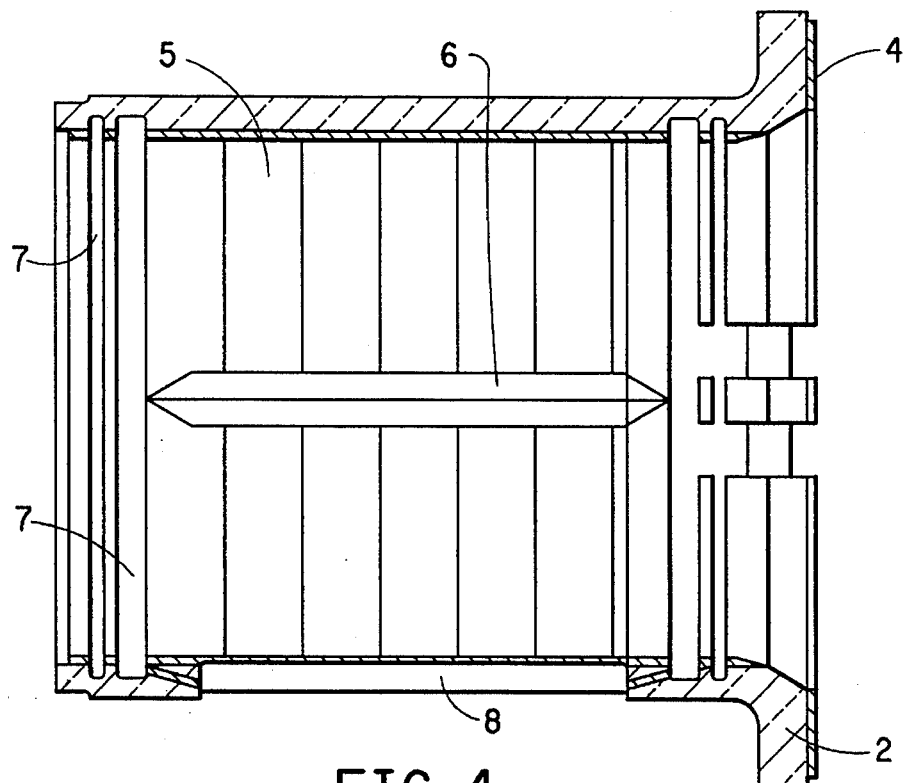
FIG. 4 is an inside sectional view of a final composite journal and thrust bearing assembly showing chamfers (6), grooves (7), and a slot (8) to serve as a wick inlet.

Once the two matching housing halves are completed as above, they are then assembled together into a fixture for final machining. The inside diameter and the thrust face are machined until smooth. As shown in FIG. 4, which is a sectional side view of the final composite journal and thrust bearing assembly, additional machining can be done at this point to provide for chamfers (6), grooves (7), and a slot (8) (7 inch length, 1⅞ inches wide) in the case where there is used a traditional wick assembly system.

We claim:

1. A composite journal and thrust bearing system comprised of a bearing housing having a journal and a thrust face wherein the thrust face and the journal are lined with a high performance polymeric material having a pressure-velocity characteristic of at least 100,000 psi ft/minute; the bearing having an inlet along the length of the bearing housing, said inlet serving as a means to feed lubricant into the inside of the bearing housing, and wherein there are grooves along the inner diameter at each end of the bearing housing.

2. The composite journal and thrust bearing system of claim 1 for use as a traction motor bearing, a crane bearing, a large off-road equipment bearing, a turbine bearing, a pump-paper dryer bearing, and a steel industry roll bearing.

3. The bearing system of claim 1 wherein the high performance polymeric material is selected from the group consisting of polyimides, polyimide-amides, polyetheretherketones, and polyetherketoneketones.

4. The bearing system of claim 1 wherein the high performance polymeric material is a polyimide.

* * * * *